Aug. 14, 1923.
B. H. JORDAN
1,464,938
GAUGING MACHINE
Filed Nov. 1, 1920  2 Sheets-Sheet 1
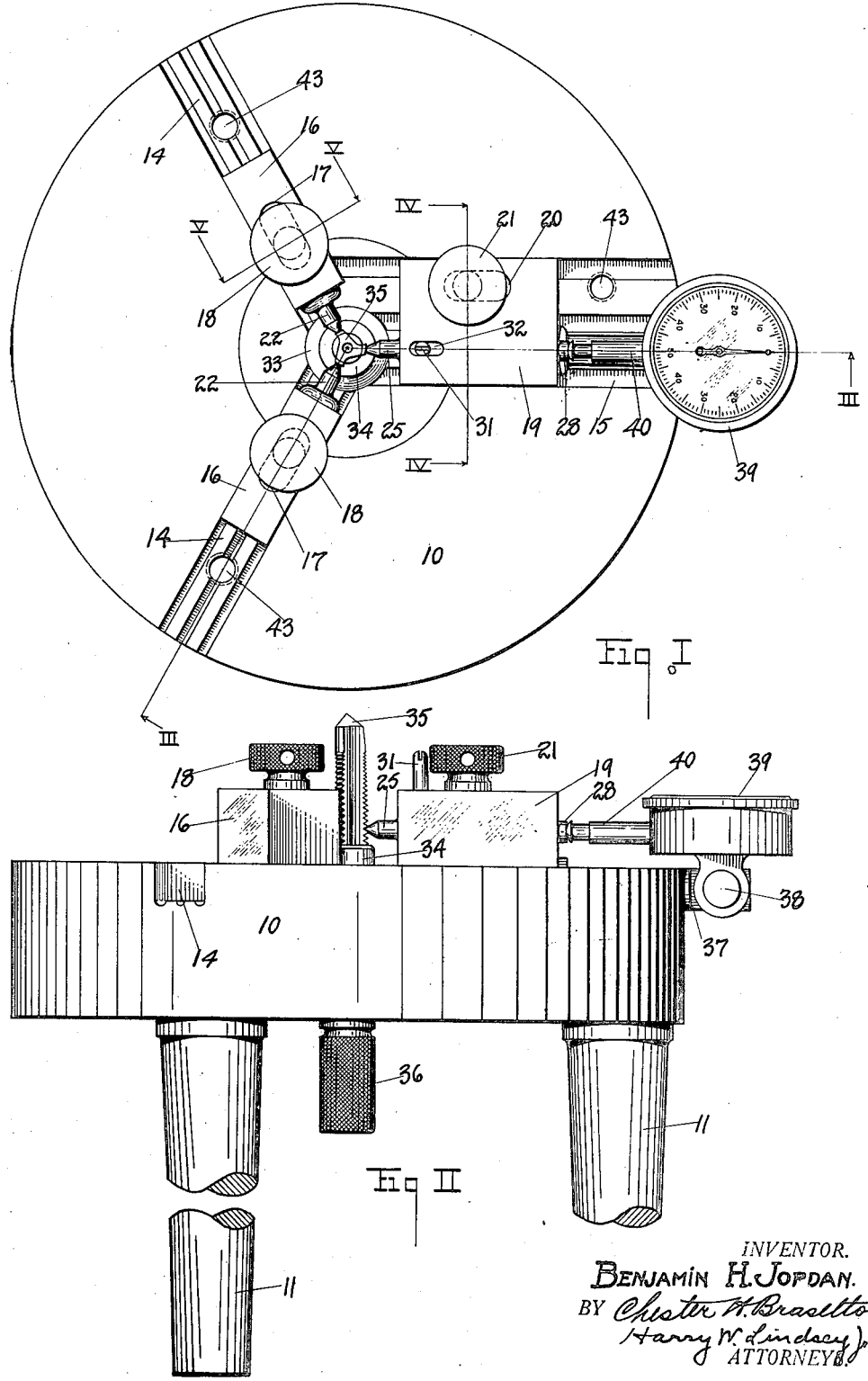
INVENTOR.
BENJAMIN H. JORDAN.
BY Chester W. Braselton
Harry W. Lindsey
ATTORNEYS.

Aug. 14, 1923.
B. H. JORDAN
GAUGING MACHINE
Filed Nov. 1, 1920    2 Sheets-Sheet 2
1,464,938
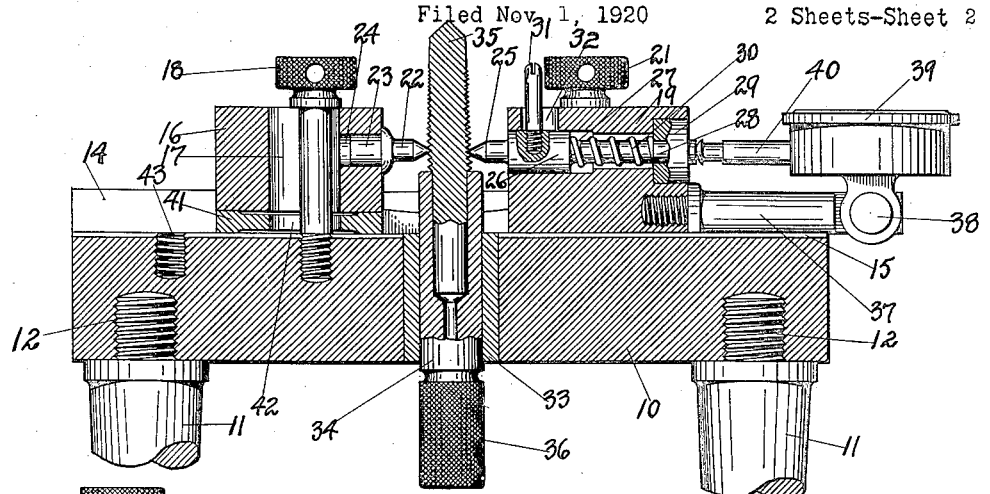
Fig III
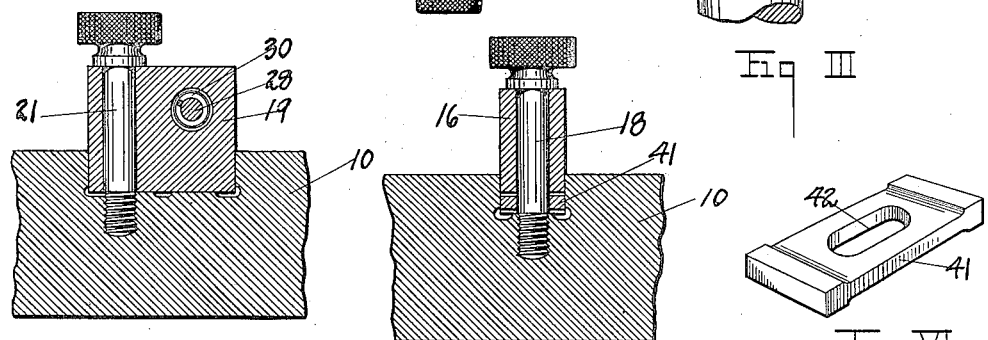
Fig IV    Fig V    Fig VI
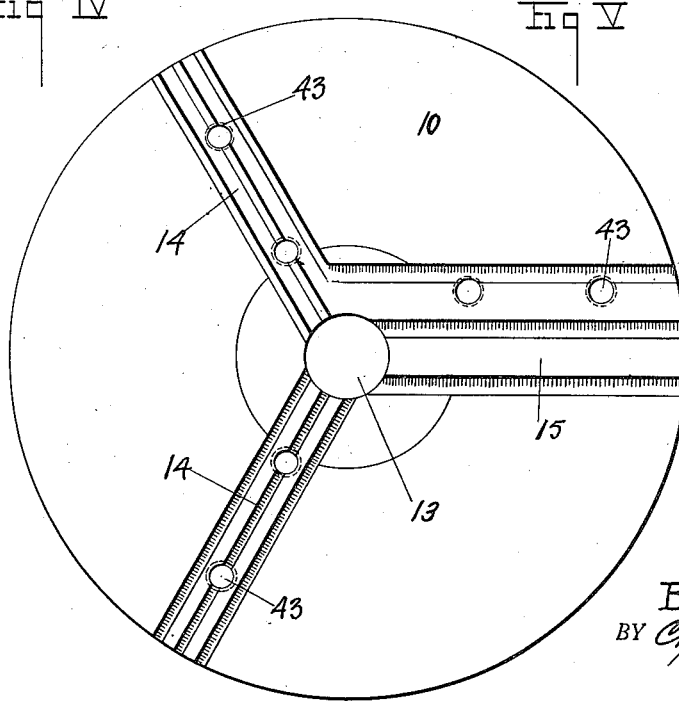
Fig VII
INVENTOR.
BENJAMIN H. JORDAN.
BY Chester W. Braselton
Harry W. Lindsey Jr.
ATTORNEYS.

Patented Aug. 14, 1923.

1,464,938

UNITED STATES PATENT OFFICE.

BENJAMIN H. JORDAN, OF ELMIRA, NEW YORK, ASSIGNOR TO THE WILLYS-MORROW COMPANY, OF ELMIRA, NEW YORK, A CORPORATION OF OHIO.

GAUGING MACHINE.

Application filed November 1, 1920. Serial No. 421,113.

*To all whom it may concern:*

Be it known that I, BENJAMIN H. JORDAN, residing at Elmira, in the county of Chemung and State of New York, have invented certain new and useful Improvements in Gauging Machines, of which I declare the following to be a full, clear, and exact description.

My invention relates to gauging machines and has for its object to provide an improved machine for indicating whether or not the dimensions of different objects agree with certain predetermined standards, and it is designed also to indicate the extent of the difference in such predetermined standards and the objects purporting to be of equal dimensions with said standards.

More particularly the invention is designed to measure, gauge or compare taps and other thread cutting tools with those constructed in accordance with certain known and predetermined standards, in order to insure accuracy in the manufacture of machines or parts of machines, in which bolts or screws are to be used for various purposes.

Another object of the invention is to provide a thread gauging machine of simple construction which can be manufactured at a relatively low cost and which may be easily operated and kept in condition for the rapid testing or gauging of taps and other tools requiring extreme accuracy in their construction.

To these and other ends the invention comprises certain novel features of construction and arrangement of parts as will be hereinafter more fully pointed out and claimed, it being understood that the machine is susceptible to various modifications and changes without departing from the spirit of the invention as expressed in the appended claims.

One embodiment of the invention is illustrated in the accompanying drawings, in which:

Figure I is a plan view of a machine embodying the invention.

Figure II is a side elevation of the same.

Figure III is a sectional elevation taken on line III—III of Figure I.

Figure IV is a fragmentary section taken on line IV—IV of Figure I.

Figure V is a fragmentary section taken on line V—V of Figure I.

Figure VI is a detailed perspective view of the removable plate shown in section beneath the slide block in Figure III.

Figure VII is a plan view of the base shown in Figure III with the gauging mechanism removed therefrom.

Like reference characters throughout the several views of the drawings indicate corresponding parts.

The present invention is designed particularly for use in connection with the testing or gauging of thread cutting tools such as taps and the like, but may be readily employed for gauging or testing the thickness of bolts, plates and other objects if desired. The invention embodies broadly a plunger or like member adapted to contact with the object to be gauged in combination with an indicating device controlled by the plunger and is first employed in connection with a member constituting a "master" of known proportions, the indicator in this case being set at zero when the plunger is in contact with the "master," after which the "master" is removed and the tool to be gauged inserted in its place, it being understood that if the tool has been accurately constructed according to dimensions of the "master," that the indicator will remain at the zero point and that if it moves from the zero point, it will indicate the extent of the difference in the "master" and the tool compared therewith. In the present instance, the "master" comprises a tap having threads of a predetermined depth and pitch and the purpose is to gauge or test a large number of taps to see that the threads thereof are uniform in depth and correspond to those of the "master." In carrying out this idea, I have provided a bed or base 10 supported by legs or standards 11 preferably screwed into the base as indicated at 12 in Figure III. The base 10 is provided with a central bore 13 from which radiate the relatively narrow guideways 14 and also a guideway 15 as shown in Figure VII. Slide blocks 16 are mounted in each of the guideways 14 and are provided with elongated vertical openings 17 through which extend the clamping screws 18 which are threaded into the base 10 as indicated in Figure III and which serve to clasp the slide blocks in various positions of adjustment upon the base. A slide block 19 is mounted in the guideway 15 and is provided at one side with an elongated vertical opening 20 through which projects a clamping screw 21 threaded into the base 10 as indicated in Figure IV. On the inner faces of the slide blocks 16 are mounted horizontally positioned pins 22 having enlarged portions 23 disposed within bores 24 formed within the blocks as indicated in Figure III, the pins being removable to permit their pointed ends to be reground from time to time. Reciprocally mounted within the block 19 is a pin or plunger 25 having an enlarged bearing portion 26 slidable in the bore 27 of the block. The enlarged bearing portion 26 is provided with a reduced extension 28, the outer end of which projects through and is guided by a bearing member 29 positioned within a recess formed within the slide block 19 as shown in Figure III. Surrounding the reduced extension 28 is a coil spring 30, the inner end of which engages the enlarged portion 26 of the plunger while the outer end of the spring is seated upon the bearing member 29. The enlarged portion 26 of the plunger is provided with an upstanding operating member 31 which projects above the slide through an elongated opening 32 therein, whereby the plunger may be moved out of contact with the member to be gauged from time to time. Firmly secured within the central bore 13 of the base 10 is a bushing or bearing member 33 which is accurately bored to receive a holder 34 for supporting the thread cutting tap 35 or other member to be gauged. The holder 34 is provided with a handle 36 by which it may be grasped and inserted within or removed from the bushing 33, it being understood that the bushing and holder are accurately ground so that a close fit is afforded between the same, whereby any possibility of relative movement between the two is prevented. Likewise the holder is bored to receive one end of the member to be gauged with may fit snugly within the bore of the holder. Projecting laterally from the slide block 19 is a removable arm or support 37 upon the outer end of which is pivoted at 38 an indicator 39 of any preferred type. In the present instance the indicator is provided with a stem 40 projecting into engagement with the outer end of the plunger 25 as shown in Figure III. The indicator is provided with a graduated rotatable dial and a hand or pointer controlled by the stem 30 which is in turn controlled by the plunger 25. The graduated dial may be rotated to bring the zero point beneath the hand of the indicator at any position of the latter.

Positioned beneath the slide blocks 16 are plates 41 having elongated openings 42 coextensive with and registering with the openings 17 in the slide blocks 16. The thickness of the plates 41 will of course vary according to the pitch of the threads of the taps to be gauged, the purpose of the blocks being to bring the points of the pins 22 at the proper height to engage in the V of the thread.

The base 10 within each of the guideways 14 and 15 is provided with threaded holes 43 which are adapted to receive the clamping screws for the slide blocks when it becomes necessary to move the latter outwardly a considerable distance at such times as it is desired to gauge taps or other tools of relatively large proportions.

It will be understood that the centers of the pins or thread contacting members 22 and the plunger 25 all lie in planes which intersect the center of the holder 34 as well as the center of the tap 35, and that preferably the centers of the pins and plunger are spaced equal distances apart, the angles between the same being 120 degrees in each case.

In the operation of my improved gauging machine, the holder 34 is inserted within the bushing 33 with a "master" tap therein. The two slides 16 are then adjusted until the pointed ends of the pins 22 extend between and into engagement with the sides of two of the adjacent threads of the tap, after which the slides are clamped upon the base. The slide 19 is then adjusted to bring the pointed end of the plunger 25 into engagement with the sides of the threads engaged by the pins 22. The dial of the indicator is then rotated until the zero point thereon coincides with the hand of the indicator. The holder 34 is then withdrawn from the bushing 33 to permit removal of the tap 35 without changing the position of the pins 22. The tap to be tested is then positioned so that the pins 22 will extend between and engage the sides of two of the adjacent threads thereof, after which the holder is inserted upwardly through the bushing to receive the tap and the pointed end of the spring pressed plunger is then allowed to extend into engagement with the threads engaged by the pins 22 on the opposite side of the tap. If the hand of the indicator continues to coincide with the zero point on the dial, the operator will know that the threads of the tap were cut to agree with those of the "master", but if the hand points to the right or left of the zero mark, the graduations on the dial will indicate to what extent the tap differs from the "master". A slight variation from the predetermined standard may be allowed within the discretion of the operator, but otherwise the taps having improperly cut threads are laid aside and returned to the manufacturer.

While I have described my invention more or less in detail, it will be understood that I do not wish to be limited to the specific construction and arrangement of parts shown, as it will be apparent that various modifications may be made in the detailed construction and manner of assembling the parts without departing from the spirit of the invention as expressed in the claims.

Having thus described my invention, what I claim as new and desire to secure by Letters Patent, is:

1. In a thread gauging machine, a base provided with a plurality of guideways radiating from a common center, a holder disposed at the point of intersection of said guideways and adapted to support a threaded member, a slide mounted in each of said guideways, a contact member carried by each slide, said contact members being adapted to engage certain of the threads of said member, and means associated with one of said contact members adapted to indicate whether or not the threads were produced according to a predetermined standard.

2. In a thread gauging machine, a base provided with a plurality of guideways radiating from a common center, a holder for a threaded member disposed at the point of intersection of said guideways, a slide mounted in each of said guideways, a contact member carried by each slide, said contact members being adapted to engage the threads at points spaced equal distances apart, and means associated with one of said contact members adapted to indicate whether or not the threads were produced according to a predetermined standard.

3. In a thread gauging machine, a base, a tubular holder upon the base adapted to receive one end of a tap, a plunger having a pointed end adapted to engage the threads of the tap, an indicator associated with said plunger to indicate whether or not the threads were produced according to a predetermined standard, and means engaging the tap to prevent movement of the same upon the holder.

4. In a thread gauging machine, a base, a holder adapted to support a tap thereon, a slide upon the base, a plunger in the slide having a pointed end adapted to extend between two of the threads of the tap, an indicator carried by the slide and controlled by the plunger to indicate whether or not the threads were produced according to a predetermined standard, and means comprising a pair of adjustable points engaging the tap between threads at points opposite the plunger to prevent movement of the same upon the holder.

5. In a thread gauging machine, a base, a holder adapted to support a tap thereon, a spring pressed plunger mounted upon the base and having a pointed end adapted to engage the threads of the tap, an indicator carried by the slide and controlled by the plunger to indicate whether or not the threads were produced according to a predetermined standard, and abutment means comprising a pair of angularly arranged points for engaging the threads of the tap at points opposite the plunger.

6. In a thread gauging machine, a base, means adapted to support a tap thereon, a plunger upon the base having a pointed end adapted to contact with the threads of the tap, an indicator associated with the plunger to determine whether or not the threads were produced according to a predetermined standard, a slide upon the base having a pin adapted to engage the threads of the tap at a point opposite said plunger, and spacing means beneath the slide for positioning said pin a predetermined distance from said base.

7. In a thread gauging machine, a base, means adapted to support a tap thereon, a plunger upon the base having a pointed end adapted to contact with the threads of the tap, an indicator associated with the plunger to determine whether or not the threads were produced according to a predetermined standard, a slide upon the base having a pin adapted to engage the threads of the tap at a point opposite said plunger, a spacing plate beneath the slide for positioning said pin a predetermined distance from said base, and means adapted to clamp said slide and said plate upon said base.

In testimony whereof, I affix my signature.

BENJAMIN H. JORDAN.